CONNECTOR SWITCH FOR TELEPHONE SYSTEMS

Filed Aug. 22, 1947 2 Sheets-Sheet 1

FIG I

*INVENTOR.*
Pier Bakker

*BY*
Smith, Olsen & Baird

Attorneys

Feb. 20, 1951 P. BAKKER 2,542,272

CONNECTOR SWITCH FOR TELEPHONE SYSTEMS

Filed Aug. 22, 1947 2 Sheets-Sheet 2

INVENTOR.
Pier Bakker

BY

Smith, Olsen & Baird

Attorneys

Patented Feb. 20, 1951 2,542,272

UNITED STATES PATENT OFFICE 2,542,272

CONNECTOR SWITCH FOR TELEPHONE SYSTEMS

Pier Bakker, Chicago, Ill., assignor to Automatic Electric Laboratories, Inc., Chicago, Ill., a corporation of Delaware Application August 22, 1947, Serial No. 770,085

10 Claims. (Cl. 179—18)

The present invention relates to telephone systems and more particularly to connector switches for use in such systems serving relatively small exchanges known as C. A. X systems.

In a C. A. X telephone system, the connector switches frequently serve private subscriber lines, P. B. X trunks and partly subscriber lines including varying numbers of connected subscriber substations; whereby the connector switches have a considerable multiplicity of functions to perform.

Accordingly, it is a general object of the present invention to provide a connector switch of the character mentioned incorporating improved and simplified circuit elements for performing its many control functions.

Another object of the invention is to provide in a connector switch of the trunk hunting type, an improved testing and operating circuit for controlling the trunk hunting operation.

Another object of the invention is to provide in a connector of the combination trunk hunting and party line type, an improved combination circuit arrangement for controlling trunk hunting and for selectively setting the ringing circuit to be employed in ringing the party lines.

A further object of the invention is to provide a connector switch of the primary-secondary motions mechanism type, incorporating an improved register switch arrangement for selectively controlling the various functions that are performed by the connector switch after the mechanism has been operated to perform a selection.

Further features of the invention pertain to the particular arrangement of the circuit elements of the system, whereby the above-outlined and additional operating features thereof are attained.

Figure 1:
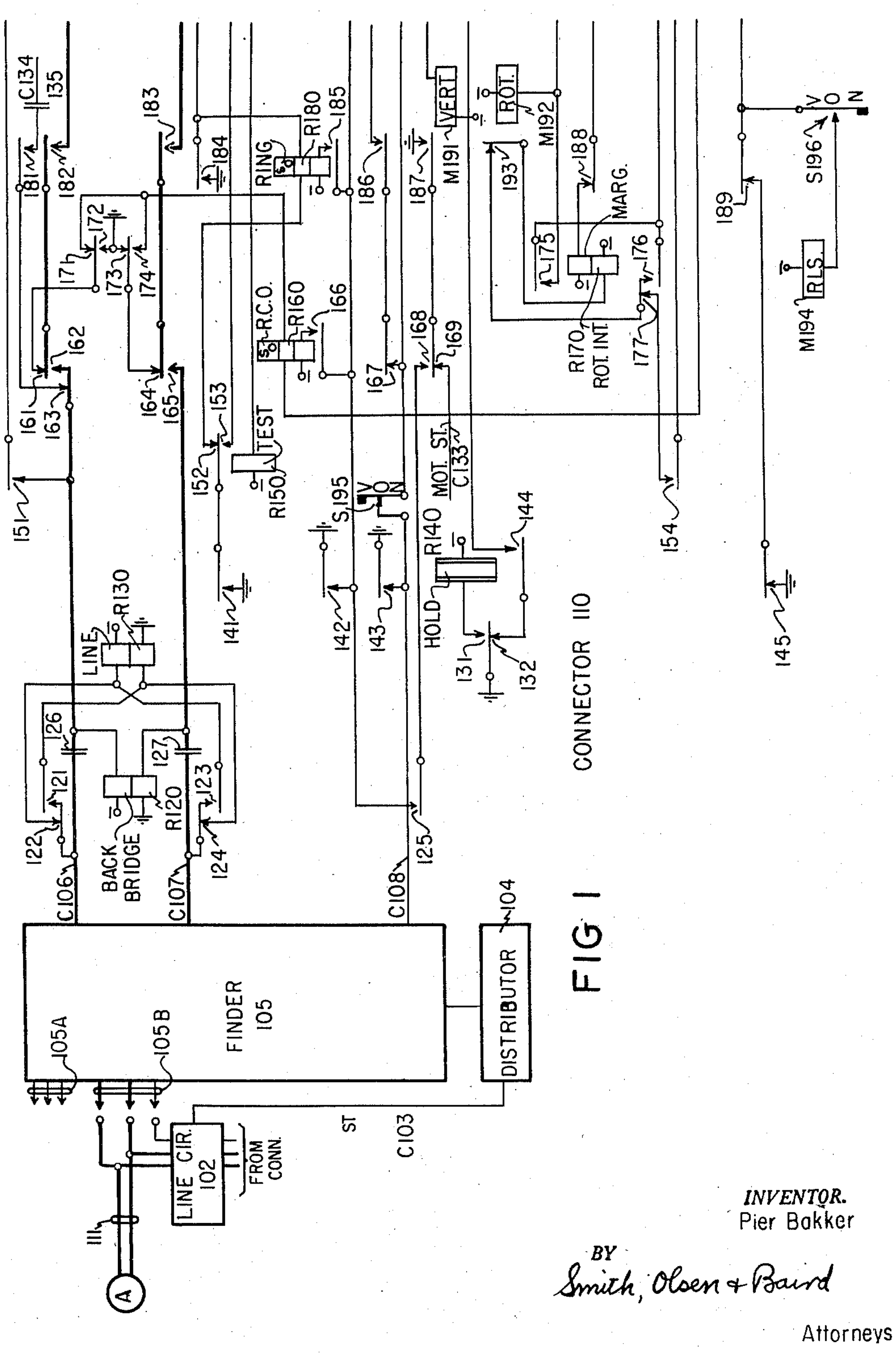
Figure 2:
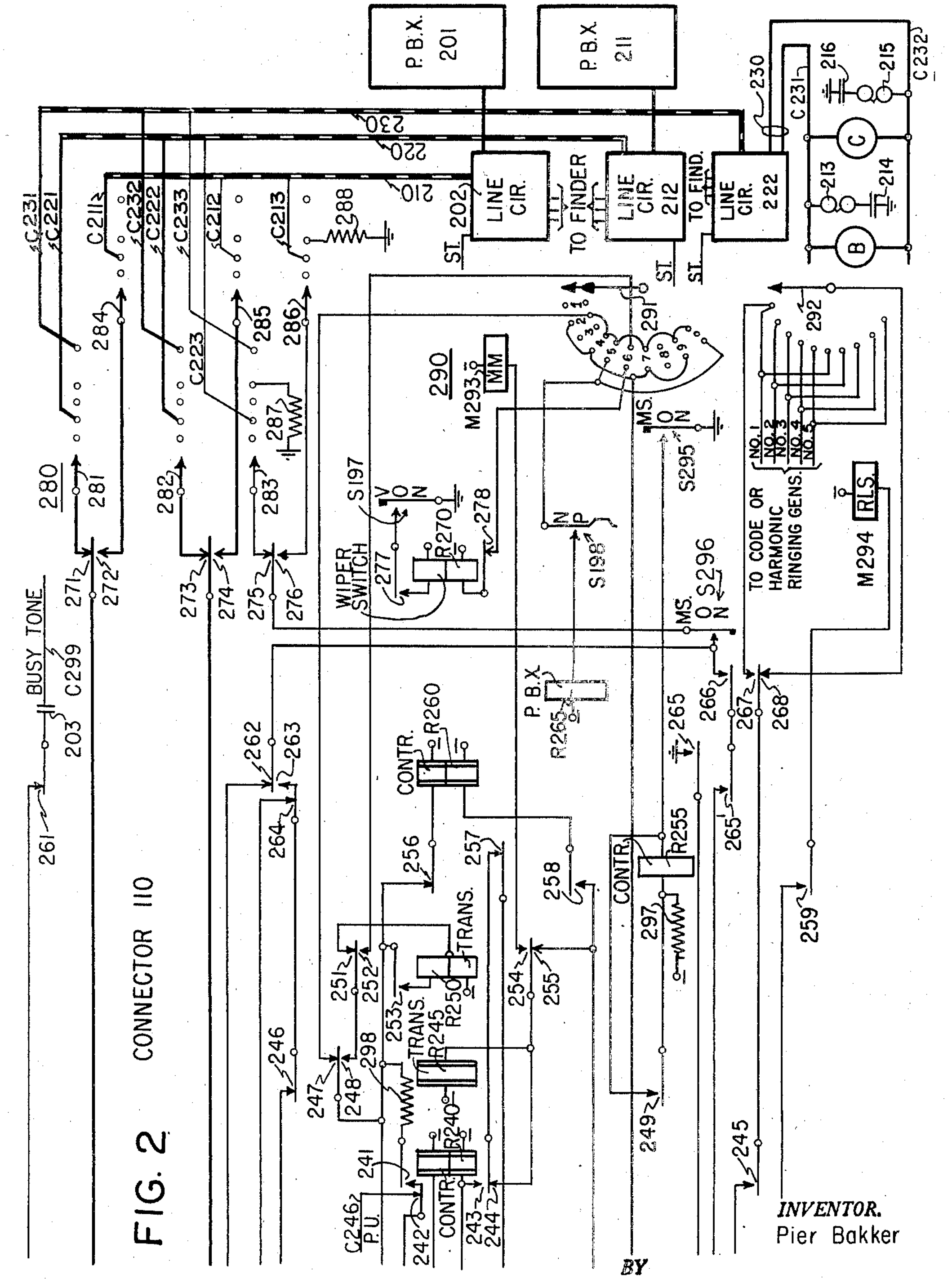

The invention, both as to its organization and method of operation, together with further objects and advantages thereof, will best be understood by reference to the following specification taken in connection with the accompanying drawings, in which Figures 1 and 2 taken together illustrate the details of an automatic telephone system having incorporated therein the features of the present invention. More particularly Figs. 1 and 2 should be arranged respectively left and right in end-to-end relation in order to form a unified diagram.

Referring now more particularly to Figs. 1 and 2 of the drawings, there is illustrated an automatic telephone system comprising an exchange terminating a plurality of subscriber lines 111, 230, etc., extending to subscriber substations, and a plurality of P. B. X trunks 210, 220, etc., extending to a plurality of P. B. X's. Specifically, the subscriber line 111 may be of the private type extending to the subscriber substation A; the subscriber line 230 may be of the four-party type extending to the subscriber substations B, C and two others not shown; the P. B. X trunk 210 may be one of a group of two extending to the P. B. X 201; and the P. B. X trunk 220 may be one of a group of three extending to the P. B. X 211. Also the exchange terminates subscriber lines of the five-party type, not shown.

Also the exchange comprises a plurality of finder-connector links, including the link consisting of the finder 105 and the connector 110; as well as an associated distributor 104. Also each subscriber line and each P. B. X trunk is provided with a line circuit individual thereto; the line circuits 102 and 222 being individually associated with the subscriber lines 111 and 230, and the line circuits 202 and 212 being individually associated with the P. B. X trunks 210 and 220.

Each of the subscriber substations A, B, C, etc., is provided with conventional substation apparatus; the subscriber substations B and C being provided with substation apparatus respectively including the ringers 213 and 215, respectively connected via the condensers 214 and 216 between ground potential and the respective line conductors C231 and C232 of the associated subscriber line 230. Each of the P. B. X's 201, 211, etc., is provided with conventional P. B. X equipment. The line circuits 102, 202, 212 and 222 may be of any conventional type; and the distributor 104 may be of any suitable type. Preferably, each of the fingers 105, etc., is of the 200-point Strowger type including a first wiper set 105A and a second wiper set 105B, each provided with three individual wipers.

Preferably, each of the connectors is identical to the connector 110 which is of the 200-point Strowger type comprising a Strowger mechanism 280 provided with a first wiper set, including the individual wipers 281, 282 and 283, and with a second wiper set, including the individual wipers 284, 285 and 286. Also the Strowger mechanism 280 comprises a vertical magnet M191 for driving the wiper carriage step-by-step in the vertical direction, a rotary magnet M192 for driving the wiper carriage step-by-step in the rotary direction, and a release magnet M194 for releasing the wiper carriage and for causing it to be returned to its normal rotary and vertical positions. Also three sets of switch springs S195, S196 and S197 are associated with the wiper carriage of the Strowger mechanism 280 and operated when the wiper carriage is driven one step in the vertical direction away from its normal vertical position. Further, a set of switch springs S198 is associated with the wiper carriage of the Strowger mechanism 280 and operated when the wiper carriage is driven a predetermined number of steps in the vertical direction away from its normal vertical position adjacent to the level in which the P. B. X trunks 210, 220, etc., are terminated in the contact bank associated with the first and second wiper sets carried by the wiper carriage. Further, the connector 110 comprises a minor switch 290 of the 10-point type provided with two wipers 291 and 292. Also the minor switch 290 comprises a magnet M293 for driving the wipers 291 and 292 step-by-step in the rotary direction away from their normal rotary positions; and a release magnet M294 for releasing the wipers 291 and 292 and for causing them to be returned to their normal rotary positions. Also two sets of switch springs S295 and S296 are associated with the wipers 291 and 292 of the minor switch 290 and operated when the wipers mentioned are driven in the rotary direction one step away from their normal rotary positions. Finally, the connector 110 comprises a relay group including a back bridge relay R120, a line relay R130, a hold relay R140, a test relay R150, a ring cut-off relay R160, a rotary interrupter relay R170, a ring relay R180, a control relay R240, two transfer relays R245 and R250, two control relays R255 and 3260, a P. B. X relay R265 and a wiper switch relay R270. Finally there are associated with the connectors 110, etc., five ringing generators, not shown, that may be either of the code ringing or of the harmonic ringing types, to which five ringing conductors extend; the five ringing conductors being designated No. 1 to No. 5, inclusive, and extending from the respective five ringing generators to the minor switches incorporated in the connectors 110, etc.

Before proceeding with the description of the extension of the various connections, the numbering plan in the exchange as well as the contact bank arrangement of the connectors 110, etc., will be explained. All subscriber lines and P. B. X trunks are provided with a three digit directory number, the first two digits of which are utilized to select two line terminals in the Strowger mechanism of the connector, and the third digit of which is registered in the minor switch of the connector to select one of the two previously selected line terminals as well as one of the five ringing codes to be employed for ringing purposes. Specifically, with reference to the connector 110, a private subscriber line, such, for example, as the private subscriber line 111 may have the directory number 111 or 116 depending upon whether it appears in the contact bank of the Strowger mechanism 280 before the first wiper set or before the second wiper set. A four-party subscriber line, such, for example, as the four-party subscriber line 230 may have the directory numbers 601 to 604, inclusive, assigned thereto; the first digit 6 indicating that the subscriber line 230 appears in the sixth level of the Strowger mechanism 280; the second digit 0 indicating that the subscriber line 230 appears in the tenth rotary position of the Strowger mechanism 280, and the third digits 1 to 4, inclusive, commonly indicating that the subscriber line 230 appears before the first wiper set of the Strowger mechanism 280 and respectively corresponding to the first four ringing codes utilized to signal the respective subscriber substations B, C and two others, not shown, connected thereto. Also a companion four-party subscriber line, not shown, may have the directory numbers 606 to 609, inclusive, assigned thereto; the first digit 6 indicating that the subscriber line mentioned appears in the sixth level of the Strowger mechanism 280; the second digit 0 indicating that the subscriber line mentioned appears in the tenth rotary position of the Strowger mechanism 280; and the third digits 6 to 9, inclusive, commonly indicating that the subscriber line mentioned appears before the second wiper set of the Strowger mechanism 280 and respectively corresponding to the first four ringing codes utilized to signal the respective four subscriber substations connected thereto.

A first five-party subscriber line, not shown, may have the directory numbers 701 to 705, inclusive, assigned thereto; the first digit 7 indicating that the subscriber line mentioned appears in the seventh level of the Strowger mechanism 280; the second digit 0 indicating that the subscriber line mentioned appears in the tenth rotary position of the Strowger mechanism 280; and the third digits 1 to 5, inclusive, commonly indicating that the subscriber line mentioned appears before the first wiper set of the Strowger mechanism 280 and respectively corresponding to the five ringing codes utilized to signal the respective five subscriber substations connected thereto. Similarly, a companion five-party subscriber line, not shown, may have the directory numbers 706 to 700, inclusive, assigned thereto; the first digit 7 indicating that the subscriber line mentioned appears in the seventh level of the Strowger mechanism 280; the second digit 0 indicating that the subscriber line mentioned appears in the tenth rotary position of the Strowger mechanism 280; and the third digits 6 to 0, inclusive, commonly indicating that the subscriber line mentioned appears before the second wiper set of the Strowger mechanism 280 and respectively corresponding to the five ringing codes utilized to signal the respective five subscriber substations connected thereto.

The group of two P. B. X trunks, including the P. B. X trunk 210 extending to the P. B. X 201, may have the directory number 610 assigned thereto; the first digit 6 indicating that this P. B. X trunk group appears in the sixth level of the Strowger mechanism 280; the second digit 1 indicating that the first P. B. X trunk in this group appears in the first rotary position of the Strowger mechanism 280; and the third digit 0 indicating that the P. B. X trunks in this group appear before the second wiper set of the Strowger mechanism 280. The group of three P. B. X trunks, including the P. B. X trunk 220 extending to the P. B. X 211, may have the directory number 615 assigned thereto; the first digit 6 indicating that this P. B. X trunk group appears in the sixth level of the Strowger mechanism 280; the second digit 1 indicating that the first P. B. X trunk in this group appears in the first rotary position of the Strowger mechanism 280; and the third digit 5 indicating that the P. B. X trunks in this group appear before the first wiper set of the Strowger mechanism 280.

In the Strowger mechanism 280 the two P. B. X trunks extending to the P. B. X 201 respectively occupy in the sixth level the first and second rotary positions; whereby the adjacent third rotary position is blank and the grounded resistor 288 is connected to the control contact as a cut-off for rotary searching operation of the Strowger mechanism 280, as explained more fully hereinafter. Similarly, in the Strowger mechanism 280, the three P. B. X trunks extending to the P. B. X 211 respectively occupy in the sixth level the first, second and third rotary positions; whereby the adjacent fourth rotary position is blank and the grounded resistor 287 is connected to the control contact as a cut-off for rotary searching operation of the Strowger mechanism 280, as explained more fully hereinafter.

Also in conjunction with the connector 110, it is noted that the five ringing codes are utilized on a divided ringing basis. For example, in conjunction with the five-party subscriber line mentioned above, to which the directory numbers 701 to 705 are assigned, it is pointed out that in response to the directory number 701 the first ringing code is projected over the negative line wiper 281; in response to the directory number 702, the second ringing code is projected over the positive line wiper 282; in response to the directory number 703, the third ringing code is projected over the negative line wiper 281; in response to the directory number 704, the fourth ringing code is projected over the positive line wiper 282; and in response to the directory number 705, the fifth ringing code is projected over the negative line wiper 281. Similarly, in conjunction with the five-party subscriber line mentioned above, to which the directory numbers 706 to 700 are assigned, it is noted that in response to the directory number 706, the first ringing code is projected over the negative line wiper 284; in response to the directory number 707, the second ringing code is projected over the positive line wiper 285; in response to the directory number 708, the third ringing code is projected over the negative line wiper 284; in response to the directory number 709, the fourth ringing code is projected over the positive line wiper 285; and in response to the directory number 700, the fifth ringing code is projected over the negative line wiper 284.

Considering now the extension of a call from the subscriber substation A connected to the individual subscriber line 111 to the subscriber substation B connected to the four-party subscriber line 239, the subscriber at the calling subscriber substation A first initiates the call; whereby the line circuit 102 individual to the subscriber line 111 is controlled to apply ground potential to the start conductor C103 in order to govern the distributor 104. The distributor 104 assigns the finder of an idle finder-connector link, such, for example, as the finder 105 of the link illustrated; whereby the finder 105 operates to find the calling subscriber line 111; it being assumed that the subscriber line 111 is accessible to the second wiper set 105B of the finder 105; whereupon the line circuit 102 is controlled in order to release the distributor 104 and to mark the subscriber line 111 as busy to the connectors 110, etc., having access thereto.

At this time a loop circuit is completed from the calling subscriber substation A via the subscriber line 111 to the line relay R130 in the connector 110; which loop circuit includes the line conductors C106 and C107, the contacts 122 and 124 and the upper and lower windings of the line relay R130; whereupon the upper and lower windings of the line relay R130 are energized causing it to operate. Upon operating the line relay R130 completes, at the contacts 131, a circuit for operating the hold relay R140. Upon operating the hold relay R140 completes, at the contacts 143, a path for applying ground potential to the control conductor C108, thereby to retain operated the finder 105. Also, at the contacts 143, the hold relay R140 completes a circuit, including the set of switch springs S195, for energizing the upper winding of the control relay R240 in order to cause the latter relay to operate. Further the hold relay R140 completes, at the contacts 142, a circuit, including the contacts 256, for energizing the upper winding of the control relay R260 in order to cause the latter relay to operate. At this time the connector 110 has been seized and is in readiness to respond to the first digit dialed at the calling subscriber substation A.

The subscriber at the calling subscriber substation A then proceeds to dial the directory number of the called subscriber substation B, which number may be 601 as previously noted. The line relay R130 follows the first digit 6; and each time it restores and then reoperates, it interrupts and then recompletes, at the contacts 131, the circuit for maintaining operated the hold relay R140; whereby the latter relay is retained in its operated position during impulsing as it is of the slow-to-release type. Also, each time the line relay R130 restores and then reoperates, it completes and then interrupts, at the contacts 132, a circuit, including the contacts 144, 257 and 243, for energizing the lower winding of the control relay R240, and a multiple circuit for energizing the vertical magnet M191; whereby the control relay R240 is retained in its operated position during the first digit, it being of the slow-to-release type, and the vertical magnet M191 is operated intermittently. Each time the vertical magnet M191 operates, it drives the wiper carriage of the Strowger mechanism 280 one step in the vertical direction; and when the wiper carriage of the Strowger mechanism 280 is driven one step in the vertical direction away from its normal vertical position, the sets of switch springs S195, S196 and S197 are operated. More particularly, the set of switch springs S195 is operated into disengagement, thereby to interrupt the previously traced circuit for energizing the upper winding of the control relay R240. Accordingly, at the conclusion of the first digit 6, the wiper carriage of the Strowger mechanism 280 occupies its sixth vertical position selecting the associated sixth level of contacts in the associated contact bank; and the line relay R130 is retained in its operated position retaining operated the hold relay R140. Shortly thereafter, the control relay R240, being of the slow-to-release type, restores to interrupt, at the contacts 243, a further point in the previously traced multiple circuit for energizing the lower winding thereof and for operating the vertical magnet M191. Also upon restoring the control relay R240 prepares, at the contacts 244, a multiple circuit traced hereinafter for energizing the winding of the transfer relay R245 and for operating the rotary magnet M192.

The line relay R130 then follows the second digit 0 retaining operated the hold relay R140 as it is of the slow-to-release type. Also, each time the line relay R130 restores and then reoperates, it completes and then interrupts, at the contacts 132, the previously mentioned circuit, including the contacts 144, 257 and 244, for energizing the winding of the transfer relay R245, and the multiple circuit, also including the contacts 255, for operating the rotary magnet M192; whereby the transfer relay R245 operates and remains operated during impulsing as it is of the slow-to-release type, and the rotary magnet M192 is operated intermittently in order to drive the wiper carriage of the Strowger mechanism 280 step-by-step in the rotary direction. At the conclusion of the second digit 0, the wiper carriage of the Strowger mechanism 280 occupies its tenth rotary position; and the line relay R130 is retained in its operated position to retain operated the hold relay R140. Shortly thereafter the transfer relay 245 restores, it being of the slow-to-operate type. Incident to operation of the transfer relay R245, it completed, at the contacts 248, a circuit, including the contacts 142 and 251, for energizing the lower winding of the transfer relay R250; whereby the latter relay operated through its first step, it being of the two step type, to complete, at the contacts 253, a path, including the contacts 251 and 248, for short-circuiting the upper winding thereof. Accordingly, at the conclusion of the second digit 0, when the transfer relay R245 restored, it interrupted, at the contacts 248, the above traced path for short-circuiting the upper winding of the transfer relay R250; whereupon a circuit, including the contacts 142 and 253, was completed for energizing in series the upper and lower windings of the transfer relay R250 in order to cause the latter relay to operate through its second step. When the transfer relay R250 operates through its second step, it interrupts, at the contacts 255, a further point in the previously traced circuit for operating the rotary magnet M192; and prepares, at the contacts 254, a point in a circuit traced hereinafter for operating the magnet M293 of the minor switch 290 when the winding of the transfer relay R245 is again energized.

The line relay R130 follows the third digit 1, retaining operated the hold relay R140 as it is of the slow-to-release type. Also, each time the line relay R130 restores and then reoperates, it completes and then interrupts, at the contacts 132, the previously mentioned circuit, including the contacts 144, 257 and 244, for energizing the winding of the transfer relay R245 and the multiple circuit, also including the contacts 254, for operating the magnet M293 of the minor switch 290; whereby the transfer relay R245 reoperates and remains operated during impulsing and the magnet M293 of the minor switch 290 is operated in accordance with the third digit 1. At the conclusion of the third digit 1, the wipers 291 and 292 of the minor switch 290 engage the first contacts in the associated contact banks; and the line relay R130 is retained operated retaining operated the hold relay R140. Shortly thereafter, the transfer relay R245 restores as it is of the slow-to-release type. When the wipers 291 and 292 of the minor switch 290 are driven away from their normal positions one step in the rotary direction, the sets of switch springs S295 and S296 are operated. More particularly, the set of switch springs S295 is operated to prepare a circuit for operating the control relay R255; which circuit may not be completed immediately while the transfer relay R245 occupies its operated position since the operated transfer relay R245 completes, at the contacts 249, a path for short-circuiting the winding of the control relay R245. However, when the transfer relay R245 restores, it interrupts, at the contacts 249, the above mentioned path for short-circuiting the winding of the control relay R255; whereby the previously mentioned circuit, including the set of switch springs S295 and the resistor 297, is completed for energizing the winding of the control relay R255; whereupon the latter relay operates.

Also it is pointed out that when the wiper carriage of the Strowger mechanism 280 is driven six steps in the vertical direction away from its normal vertical position, the set of switch springs S198 is operated in order to prepare a circuit traced hereinafter for operating the P. B. X relay R265; which circuit will not be completed in the present example; however, the circuit mentioned is prepared since the subscriber line 230 appears in the sixth level along with two groups of P. B. X trunks extending to the P. B. X's 201 and 211.

At this time the first wiper set including the wipers 281, 282 and 283 of the Strowger mechanism 280 has selected the four-party subscriber line 230 to which the subscriber substations B, C, etc., are connected; and the second wiper set including the wipers 284, 285 and 286, of the Strowger mechanism 280 has selected the companion four-party subscriber line, not shown, however, the four-party subscriber line 230 is effectively selected since the wiper switch relay R270 occupies its restored position in the present example. Accordingly, further operation of the connector 110 depends upon the idle or busy condition of the called subscriber line 230. First assuming that the called subscriber line 230 is busy at this time, ground potential appears upon the control conductor C233 thereof and is applied to the control wiper 283 of the first wiper set of the Strowger mechanism 280; thereby to complete a circuit, including the contacts 275, the set of switch springs S296, the contacts 263 and 246, for operating the test relay R150. Upon operating the test relay R150 prepares, at the contacts 153, a holding circuit for energizing the winding thereof. Shortly following the conclusion of the third digit 1, the transfer relay R245 restores effecting operation of the control relay R255 as previously explained. Upon operating the control relay R255 interrupts, at the contacts 256, the previously traced circuit for energizing the upper winding of the control relay R260; whereupon the latter relay restores shortly thereafter, it being of the slow-to-release type. Upon restoring the control relay R260 completes, at the contacts 264, the previously mentioned holding circuit, including the contacts 141, 153 and 246, for maintaining operated the test relay R150; and interrupts, at the contacts 263, the original circuit for operating the test relay R150. Further, the control relay R260 completes, at the contacts 261, a path, including the condenser 203, the contacts 151, and the condenser 126, for connecting the busy tone conductor C299 to the line conductor C106; whereby busy tone current is returned over the subscriber line 111 to the calling subscriber substation A in order to indicate the condition noted to the subscriber thereat. The subscriber at the calling subscriber substation A then disconnects in order to effect the release of the finder 105 and the connector 110 in a manner more fully explained hereinafter.

Now assuming that the subscriber line 230 is idle when it is selected by the first wiper set of the Strowger mechanism 280, battery potential appears upon the control conductor C233 thereof, thereby to complete a path substantially identical to that previously traced for short-circuiting the winding of the test relay R150 in order positively to prevent operation of the latter relay at this time. Accordingly, when the control relay R260 restores shortly following operation of the control relay R255 in the manner previously explained, it interrupts, at the contacts 263, the above mentioned path for short-circuiting the winding of the test relay R150; and completes, at the contacts 262, a circuit for energizing the upper winding of the ring relay R180. The circuit mentioned extends from ground potential by way of the contacts 141 and 152, the upper winding of the ring relay R180, the contacts 262, the set of switch springs S296, the contacts 275, and the control wiper 283 of the first wiper set of the Strowger mechanism 280 to the control conductor C233 of the subscriber line 230 having battery potential thereon. Shortly after this circuit is completed, the ring relay R180 operates as it is of the slow-to-operate type. Upon operating the ring relay R180 completes, at the contacts 185, a holding circuit, including the contacts 142, for energizing the lower winding thereof; and completes, at the contacts 184, a path, including the contacts 152 and 141, for short-circuiting the upper winding thereof and a multiple path, including the contacts 262, the set of switch spring S296, the contacts 275 and the control wiper 283 of the first wiper set of the Strowger mechanism 280 for applying ground potential to the control conductor C233 of the subscriber line 230; whereupon the line circuit 222 individual to the subscriber line 230 operates to mark the subscriber line 230 as busy to the other connectors having access thereto.

Also the ring relay R180 completes, at the contacts 187, a path, including the contacts 169, for applying ground potential to the motor start conductor C133 in order to insure operation of the ringing generators connected to the ringing conductors No. 1 to No. 5, inclusive. Further, the ring relay R180 completes, at the contacts 186, a connection between the pick-up conductor C246 and the upper winding of the control relay R240; which connection also includes the contacts 242 and 167. At the beginning of the next ringing cycle of the five ringing generators, ground potential is applied to the pick-up conductor C246; whereby the upper winding of the control relay R240 is energized causing the latter relay to operate. Upon operating the control relay R240 completes, at the contacts 241, a holding circuit, including the contacts 142, the resistor 298, and the contacts 186 and 167, for energizing the upper winding thereof; and interrupts, at the contacts 242, the original circuit for energizing the upper winding thereof. Further, the control relay R240 completes, at the contacts 245, a path, including the wiper 292 of the minor switch 290 and the engaged first contact in the associated contact bank, the contacts 268, the upper winding of the ring cut-off relay R160, the contacts 171, 161, 182 and 271 and the line wiper 281 of the first wiper set of the Strowger mechanism 280 between the ringing conductor No. 1 and the negative line conductor C231 of the subscriber line 230; ground potential being applied by way of the contacts 173, 164, 183 and 273 and the line wiper 282 of the first wiper set of the Strowger mechanism 280 to the positive line conductor C232 of the subscriber line 230. This application of ringing potential and ground potential respectively to the line conductors C231 and C232 of the subscriber line 230 effect operation of the ringer 213 individual to the subscriber substation B connected to the subscriber line 230; which ringer 213 is operated either on a harmonic basis or on a code basis; thereby to indicate to the subscriber at the called subscriber substation B that a call is waiting to be answered. Also the ring relay R180 completes, at the contacts 181, a connection, including the condenser 135, the contacts 163, and the condenser 126 between the ring back tone conductor C134 and the line conductor C106; whereby ring back tone current is returned over the finder 105 and the subscriber line 111 to the calling subscriber substation A in order to indicate to the subscriber thereat that the called subscriber substation B is being rung at this time.

When the subscriber at the called subscriber substation B answers the call, a circuit substantially identical to that previously traced is completed for energizing effectively the upper winding of the ring cut-off relay R160; whereby the latter relay operates shortly thereafter, it being of the slow-to-operate type. Upon operating, the ring cut-off relay R160 completes, at the contacts 166, a holding circuit, including the contacts 142, for energizing the lower winding thereof; interrupts, at the contacts 161 and 164, the previously traced circuit for projecting ringing current over the called subscriber line 230; interrupts, at the contacts 163, the previously traced path for returning ring back tone current over the calling subscriber line 111; and interrupts, at the contacts 169, the path for applying ground potential to the motor start conductor C133. Also the ring cut-off relay R160 interrupts, at the contacts 167, the previously traced holding circuit for energizing the upper winding of the control relay R240 in order to cause the latter relay to restore shortly thereafter, it being of the slow-to-release type. Finally, the ring cut-off relay R160 completes, at the contacts 162 and 165, a loop circuit, including the contacts 182, 183, the contacts 271, 273 and the line wipers 281, 282, of the first wiper set of the Strowger mechanism 280 between the line conductors C231 and C232 of the subscriber line 230 and the upper and lower windings of the back bridge relay R120; which loop circuit extends to the called subscriber substation B; whereby the back bridge relay R210 operates. Upon operating the back bridge relay R120 reverses at the contacts 121, 122, 123 and 124, the polarity of the calling subscriber line 111 with respect to the upper and lower windings of the line relay R130; which reversal of polarity may be utilized for metering purposes in a conventional manner. Also the back bridge relay R120 completes, at the contacts 125, a multiple holding circuit, including the contacts 168 and 187, for energizing the lower windings of the ring cut-off relay R160 and the ring relay R180. At this time the loop circuit extending from the calling subscriber substation A via the subscriber line 111 to the upper and lower windings of the line relay R130 is interconnected by way of the condensers 126 and 127 to the loop circuit extending from the called subscriber substation B via the subscriber line 230 to the upper and lower windings of the back bridge relay R120; whereby an operative connection is completed between the calling subscriber substation A and the called subscriber substation B and the two-way communication therebetween may begin.

At the conclusion of the established connection, when the subscriber at the called subscriber substation B disconnects, the loop circuit extending to the upper and lower windings of the back bridge relay R120 is interrupted; whereby the latter relay restores to interrupt, at the contacts 125, the multiple holding circuits for energizing the lower windings of the ring cut-off relay R160 and the ring relay R180. Subsequently, when the subscriber at the calling subscriber substation A disconnects, the loop circuit extending to the upper and lower windings of the line relay R130 is interrupted; whereby the latter relay restores to interrupt, at the contacts 131, the circuit for maintaining operated the hold relay R140; whereupon the latter relay restores shortly thereafter, it being of the slow-to-release type. Upon restoring the hold relay R140 interrupts, at the contacts 142, the multiple holding circuits for energizing the lower windings of the ring cut-off relay R160 and the ringing relay R180 as well as the multiple holding circuit for energizing in series the upper and lower windings of the transfer relay R250; whereby the relays mentioned restore. Also upon restoring, the hold relay R140 interrupts, at the contacts 143, the path for applying ground potential to the control conductor C108, thereby to effect the release of the finder 105; whereupon the line circuit 102 is controlled in order to mark the subscriber line 111 as idle to the connectors 110, etc., having access thereto. Finally, the hold relay R140 completes, at the contacts 145, a circuit, including the contacts 189 and the set of switch springs S196 for operating the release magnet M194; and a multiple circuit, also including the contacts 259, for operating the release magnet M294. Upon operating the release magnet M194 releases the wiper carriage of the Strowger mechanism 280; whereby it is returned to its normal rotary and vertical positions. When the wiper carriage of the Strowger mechanism 280 is thus released, the sets of switch springs S195, S196, S197 and S198 are operated. Specifically, the set of switch springs S196 is operated into disengagement, thereby to interrupt the circuit for operating the release magnet M194. Upon operating the release magnet M294 releases the wipers 291 and 292 of the minor switch 290; whereby they are returned to their normal rotary positions. When the wipers noted of the minor switch 290 are thus released, the sets of switch springs S295 and S296 are operated. Specifically the set of switch springs S295 is actuated into disengagement, thereby to interrupt the circuit for maintaining operated the control relay R255; whereupon the connector 110 is completely released. When the connector 110 is thus released, ground potential is removed from the control conductor C233 of the subscriber line 230; whereby the line circuit 222 is controlled in order again to mark the subscriber line 230 as idle to the connectors 110, etc., having access thereto. At this time the established connection between the calling subscriber substation A and the called subscriber substation B is released and all of the apparatus involved therein is completely released and available for further use.

In view of the foregoing description of the operation of the connector 110 to extend a call from the calling subscriber substation A to the called subscriber substation B in response to the directory number 601, it will be understood that it is operative in almost an identical manner to extend a call from the calling subscriber substation A to the called subscriber substation C in response to the directory number 602. However, in this example, assuming that the called subscriber substation B is idle, when the ring relay R180 operates, it also completes, at the contacts 188, a circuit, including the wiper 291 of the minor switch 290 and the engaged second contacts in the associated contact bank, and the contacts 247 and 142 for energizing the upper winding of the rotary interrupter relay R170; whereupon the latter relay operates. Upon operating the rotary interrupter relay R170 reverses, at the contacts 171, 172, 173 and 174, the paths for applying ground and ringing potentials to the line conductors C231 and C232 of the called subscriber line 230. More particularly, in this example, ground potential is applied by way of the contacts 172, 161, 182 and 271 and the line wiper 281 to the negative line conductor C231 of the subscriber line 230; and the ringing conductor No. 2 is connected by way of the wiper 292 of the minor switch 290 and the engaged second contacts in the associated contact bank, the contacts 268 and 245, the upper winding of the ring cut-off relay R160, the contacts 174, 164, 183 and 273 and the line wiper 282 to the positive line conductor C232 of the subscriber line 230. The application of ground and ringing potentials respectively to the negative and positive line conductors C231 and C232 of the subscriber line 230 effect operation of the ringer 215 at the called subscriber substation C either on a code basis or on a harmonic basis, thereby to indicate to the subscriber at the called subscriber substation C that a call is waiting to be answered. The subsequent operation of the connector 110 in response to answering of the call at the called subscriber substation C is identical to that previously explained; and the subsequent release of the connector 110 and the finder 105 is the same as that previously described. In this conjunction, when the ring relay R180 restores, incident to the release of the connector 110, it interrupts, at the contacts 188, the circuit for energizing the upper winding of the rotary interrupter relay R170; whereupon the latter relay restores to effect the complete release of the connector 110.

In view of the foregoing, it will be understood that connections may be respectively extended from the calling subscriber substation A to the other two subscriber substations, not shown, connected to the subscriber line 230 by the connector 110 in response to the respective directory numbers 603 and 604. In this conjunction, it will be appreciated that the third subscriber substation, not shown, connected to the subscriber line 230, is rung from the generator No. 3 via the negative line conductor C231 of the subscriber line 230; and that the fourth subscriber substation, not shown, connected to the called subscriber line 230, is rung from the generator conductor No. 4 via the positive line conductor C232 of the subscriber line 230.

Finally, it will be understood that respective connections may be extended from the calling subscriber substation A to the four subscriber lines connected to the companion four-party subscriber lines in response to the respective directory numbers 606, 607, 608 and 609. In this conjunction, it is noted that during the reception of the third digits 6, 7, 8 or 9, the wiper 291 of the minor switch 290 bridges the sixth contacts in the associated contact bank completing a circuit, including the contacts 278, 252, 248 and 142, for energizing the lower winding of the switch relay R270; whereupon the latter relay operates. Upon operating the wiper switch relay R270 completes, at the contacts 277, a holding circuit, including the set of switch springs S197, for energizing the upper winding thereof; interrupts, at the contacts 271, 273 and 275, the connections to the first wiper set, including the wipers 281, 282 and 283, of the Strowger mechanism 280; and completes, at the contacts 272, 274 and 276, connections to the second wiper set, including the wipers 284, 285 and 286, of the Strowger mechanism 280. Accordingly, since the wiper switch relay R270 occupies its operated position, the connection is extended to the companion four-party subscriber line; the selection of the ringing codes as well as the division of ringing being under the control of the minor switch 290 and carried out in the manner previously explained. In this conjunction it is noted that when the connector 110 is released, the set of switch springs S197 is operated to interrupt the holding circuit for energizing the upper winding of the wiper switch relay R270 when the wiper carriage of the Strowger mechanism 280 is returned to its normal vertical position causing the wiper switch relay R270 to restore completing the release of the connector 110.

Considering now the extension of a connection from the calling subscriber substation A to the P. B. X 211, the call is initiated at the calling subscriber substation A; whereby the link illustrated may be taken for use. The subscriber at the calling subscriber substation A then dials the directory number 615; whereupon the connector 110 responds to the first digit 6 and to the second digit 1 in order to operate the Strowger mechanism 280 to the corresponding sixth level and first rotary position. The third digit 5 is then registered by the connector 110 in the minor switch 290 in the manner previously explained; and at the conclusion of the third digit 5, the transfer relay R245 restores as previously pointed out in order to complete, in this example, at the contacts 247, a circuit for operating the P. B. X relay R265. Specifically, the set of switch springs S198 is operated since the wiper carriage of the Strowger mechanism 280 occupies the sixth level; and the wiper 291 of the minor switch 290 bridges the fifth contacts in the associated contact bank. The circuit for operating the P. B. X relay R265 includes the contacts 142 and 247, the wiper 291 of the minor switch 290 and the engaged fifth contacts in the associated contact bank, and the set of switch springs S198. Also at this time the first wiper set, including the wipers 281, 282 and 283 of the Strowger mechanism 280 engage the first contact set in the associated sixth level terminating the first P. B. X trunk extending to the P. B. X 211. Accordingly, at this time the idle or busy condition of the first P. B. X trunk extending to the P. B. X 211 is tested, ground or battery potentials being respectively upon the control conductor thereof in the event of busy or idle conditions thereof in the usual manner.

Assuming that the first P. B. X trunk extending to the P. B. X 211 is busy at this time, ground potential appearing upon the control conductor thereof is applied to the control wiper 283 of the first wiper set of the Strowger mechanism 280 completing the previously traced circuit for operating the test relay R150. In the present example, upon operating the test relay R150 completes, at the contacts 154, a circuit, including the grounded control wiper 283 of the first wiper set of the Strowger mechanism 280, the contacts 275, the set of switch springs S296, the contacts 266, 265', 177 and 193, for energizing the lower winding of the rotary interrupter relay R170; whereupon the latter relay operates. Upon operating the rotary interrupter relay R170 completes, at the contacts 176, a holding circuit, including the contacts 265 and 193, for energizing the lower winding thereof; and interrupts, at the contacts 177, the original circuit for energizing the lower winding thereof. Also the rotary interrupter relay R170 completes, at the contacts 175, a circuit, including the contacts 265, for operating the rotary magnet M192 and a multiple circuit, also including the contacts 258, for energizing the lower winding of the control relay R260; whereby the rotary magnet M192 is operated in order to drive the wiper carriage of the Strowger mechanism 280 an additional step in the rotary direction; and the control relay R260 is retained in its operated position notwithstanding operation of the control relay R255 in the manner previously explained. Also upon operating, the rotary magnet M192 interrupts, at the contacts 193, the previously traced holding circuit for energizing the lower winding of the rotary interrupter relay R170, thereby to cause the latter relay to restore. Upon restoring the rotary interrupter relay R170 interrupts, at the contacts 175, the above traced multiple circuit for operating the rotary magnet M192 and for energizing the lower winding of the control relay R260. Further, the rotary interrupter relay R170 interrupts, at the contacts 176, a further point in the holding circuit for energizing the lower winding thereof; and reprepares, at the contacts 177, the previously traced connection between the test wiper 283 of the first wiper set of the Strowger mechanism 280 and the lower winding of the rotary interrupter relay R170.

Accordingly, at this time the test relay R150 tests the idle or busy condition of the second P. B. X trunk 220 extending to the P. B. X 211; whereupon the test relay R150 is reoperated in order to effect reoperation of the rotary interrupter relay R170 in the event the second P. B. X trunk 220 extending to the P. B. X 211 is busy; whereupon the rotary interrupter relay R170 upon reoperating, effects reoperation of the rotary magnet M192 and holding of the control relay R260; whereupon the wiper carriage of the Strowger mechanism 280 is driven an additional step in the rotary direction.

At this time the third and last P. B. X trunk extending to the P. B. X 211 is tested; whereupon the cycle above described is repeated in the event the last mentioned P. B. X trunk is busy; whereupon the wiper carriage of the Strowger mechanism 280 is driven an additional step in the rotary direction beyond the P. B. X trunks extending to the P. B. X 211 for a purpose more fully explained hereinafter.

Reconsidering the operation of the connector 210 in the event any one of the three P. B. X trunks extending to the P. B. X 211 is tested as being idle, the test relay R150 fails to operate; whereby the control relay R260 restores shortly thereafter. Upon restoring the control relay R260 cuts off at the contacts 263, testing by the test relay R150 and completes, at the contacts 262, the previously traced circuit for energizing the upper winding of the ring relay R180; whereby the selected idle P. B. X trunk extending to the P. B. X 211 is seized and rung. In this conjunction it is noted that the seized P. B. X trunk extending to the P. B. X 211 is always rung from the ringing generator conductor No. 1 since the P. B. X relay R265 cuts off at the contacts 268, the ringing connection to the wiper 292 of the minor switch 290; and completes, at the contacts 267, a direct connection to the ringing generator conductor No. 1. This connection extends from the contacts 267 of the operated P. B. X relay R265 by way of the contacts 245 and thence through the upper winding of the ring cut-off relay R160. The ringing circuit is further completed through the contacts 171, 161, 182 and 271 and the line wiper 281 of the first wiper set of the Strowger mechanism 280 to the negative line conductor of the seized P. B. X trunk extending to the P. B. X 211.

In the present example, it may be assumed that the connector 110 causes the Strowger mechanism 280 to select via the first wiper set the second P. B. X trunk 220 extending to the P. B. X 211; whereby the ring relay R180 operates in order to complete, at the contacts 184, the previously traced path for applying ground potential via the control wiper 283 of the first wiper set of the Strowger mechanism 280 to the control conductor C223 of the P. B. X trunk 220; whereupon the line circuit 212 operates in order to mark the P. B. X trunk 220 as busy to the other connectors having access thereto. The operation of the ring cut-off relay R160 in the connector 110 when the call is answered on the second P. B. X trunk 220 in the P. B. X 211 is the same as that previously described; and the ultimate release of the established connection between the calling subscriber substation A and the called P. B. X 211 is identical to that previously explained.

Finally, in conjunction with the operation of the connector 110, it is pointed out that in the event all three of the P. B. X trunks in the group extending to the P. B. X 211 are busy, the Strowger mechanism 280 is controlled in order to drive the wiper carriage past the third and last P. B. X trunk in the group mentioned; whereby the control wiper 283 of the first wiper set of the Strowger mechanism 280 engages the fourth contact in the associated contact bank terminating the grounded resistor 287; whereby resistance ground potential is applied thereto. The application of resistance ground potential to the control wiper 283 of the first wiper set of the Strowger mechanism 280 again completes the circuit for operating the test relay R150. Upon operating the test relay R150 completes, at the contacts 154, the previously traced connection between the lower winding of the rotary interrupter relay R170 and the test wiper 283 of the first wiper set of the Strowger mechanism 280; however, the rotary interrupter relay R170 is not reoperated at this time as it is of the marginal type, by virtue of the inclusion of the resistor 287 in the circuit for energizing the lower winding thereof. Since the rotary interrupter relay R170 is not reoperated, further operation of the rotary magnet M192 is arrested; whereby the wiper carriage of the Strowger mechanism 280 is not operated further in the rotary direction. Shortly thereafter, the control relay R260 restores interrupting, at the contacts 263, the test circuit for the test relay R150; and completing, at the contacts 264, the holding circuit for retaining operated the test relay R150; whereby busy tone current is returned over the line conductor C106, the finder 105 and the subscriber line 111 to the calling subscriber substation A in order to indicate to the subscriber thereat that all of the P. B. X trunks in the group extending to the P. B. X 211 are busy at this time. The subscriber at the calling subscriber substation A then disconnects in order to bring about the release of the connector 110 and the finder 105 in a manner substantially identical to that previously explained.

Considering now the extension of a connection from the calling subscriber substation A to the P. B. X 201, the call is initiated at the calling subscriber substation A; whereby the link illustrated may be taken for use. The subscriber at the calling subscriber substation A then dials the directory number 610; whereupon the connector 110 responds to the first digit 6 and to the second digit 1 in order to operate the Strowger mechanism 280 to the corresponding sixth level and first rotary position. The third digit 0 is then registered by the connector 110 in the minor switch 290 in the manner previously explained. During the registration of the third digit 0 in the minor switch 290, when the wiper 291 thereof bridges the sixth contacts in the associated contact bank, the previously traced circuit for energizing the lower winding of the wiper switch relay R270 is completed; whereby the latter relay operates to complete, at the contacts 277, the previously traced holding circuit for energizing the upper winding thereof; and to interrupt, at the contacts 278, the original circuit for energizing the lower winding thereof. Also the wiper switch relay R270 interrupts, at the contacts 271, 273 and 275, the connections between the first wiper set of the Strowger mechanism 280 and the connector 110; and completes, at the contacts 272, 274 and 276, the connections between the second wiper set of the Strowger mechanism 280 and the connector 110. At the conclusion of the third digit 0, the transfer relay R245 restores as previously pointed out in order to complete, in this example, at the contacts 247, a circuit for operating the P. B. X relay R265. Specifically the set of switch springs S198 is operated since the wiper carriage of the Strowger mechanism 280 occupies the sixth level; and the wiper 291 of the minor switch 290 bridges the tenth contacts in the associated contact bank. The circuit for operating the P. B. X relay R265 includes the contacts 142 and 247, the wiper 291 of the minor switch 290 and the engaged tenth contacts in the associated contact bank, and the set of switch springs S198. Also at this time, the second wiper set, including the wipers 284, 285, and 286, of the Strowger mechanism 280 engage the first contact set in the associated sixth level terminating the first P. B. X trunk extending to the P. B. X 201. Accordingly, at this time the idle or busy condition of the first P. B. X trunk extending to the P. B. X 201 is tested, ground or battery potentials being respectively upon the control conductor thereof in the event of busy or idle conditions thereof in the usual manner.

Assuming that the first P. B. X trunk extending to the P. B. X 201 is busy at this time, ground potential appearing upon the control conductor thereof is applied to the control wiper 286 of the second wiper set of the Strowger mechanism 280 completing the previously traced circuit for operating the test relay R150. Upon operating the test relay R150 effects operation of the rotary interrupter relay R170; whereby the latter relay effects operation of the rotary magnet M192 and holding of the control relay R260; whereby the wiper carriage of the Strowger mechanism 280 is driven an additional step in the rotary direction; all in the manner previously explained. At this time the connector 110 operates to test the idle or busy condition of the second P. B. X trunk 210 in the group extending to the P. B. X 201.

The subsequent operation of the connector 110 is the same as that previously described; whereby it is operated to seize the second P. B. X trunk 210 in the group extending to the P. B. X 201 in the event it is idle or the Strowger mechanism 280 is operated past the group of P. B. X trunks extending to the P. B. X 201 in the event the second and last P. B. X trunk 210 therein is busy at this time. In the last mentioned event, the connector 110 operates in order to cause busy tone current to be returned to the calling subscriber substation A in the manner previously explained. In the event either of the two P. B. X trunks in the group extending to the P. B. X 201, is tested as idle by the connector 110, it is seized thereby in the manner previously explained. Assuming that the second P. B. X trunk 210 in the group extending to the P. B. X 201 is seized by the connector 110, ringing current is projected thereover and the line circuit 202 is operated in order to mark the P. B. X trunk 210 as busy to the other connectors having access thereto. The subsequent operation of the connector 110 in response to answering of the call on the P. B. X trunk 210 at the P. B. X 201 is the same as that previously explained and the ultimate release of the connector 110 is the same as previously described.

In view of the foregoing, it is apparent that there has been provided a connector switch that is especially useful in C. A. X telephone systems that includes improved and simplified circuit controlling elements and functions.

While there has been described what is at present considered to be the preferred embodiment of the invention, it will be understood that various modifications may be made therein, and it is intended to cover in the appended claims, all such modifications as fall within the true spirit and scope of the invention.

What is claimed is:

1. In a telephone system including a calling line, an automatic switch associated with said calling line, and a group of trunks accessible to said switch; said switch comprising a wiper set including a test wiper, first and second relays, means controllable over said calling line for operating said wiper set to select the first trunk in said group, means controlled following operation of said wiper set to select any one of the trunks in said group for completing a first test circuit for said first relay including said test wiper, said first relay being operated via said first test circuit in the event either a first potential or a second potential is applied to said test wiper, means responsive to failure of operation of said first relay for seizing the one of the trunks in said group selected by said wiper set, means responsive to operation of said first relay for completing a second test circuit for said second relay including said test wiper, said second relay being operated via said second test circuit only in the event said first potential is applied to said test wiper, means responsive to operation of said second relay for operating said wiper set to select the next trunk in said group so that the trunks in said group may be successively selected by said wiper set, means responsive jointly to operation of said first relay and to failure of operation of said second relay for returning a busy signal over said calling line indicating a busy condition of all of the trunks in said group, said first potential being applied to said test wiper in response to operation of said wiper set to select a busy one of the trunks in said group, and means for applying said second potential to said test wiper in response to operation of said wiper set beyond the last trunk in said group.

2. In a telephone system including a calling line, an automatic switch associated with said calling line, and a group of trunks accessible to said switch; said switch comprising a wiper set including a test wiper, a first relay, a second relay of the marginal type, means controllable over said calling line for operating said wiper set to select the first trunk in said group, means controlled following operation of said wiper set to select any one of the trunks in said group for completing a first test circuit for said first relay including said test wiper, said first relay being operated via said first test circuit in the event either a high potential or a low potential is applied to said test wiper, means responsive to failure of operation of said first relay for seizing the one of the trunks in said group selected by said wiper set, means responsive to operation of said first relay for completing a second test circuit for said second relay including said test wiper, said second relay being operated via said second test circuit only in the event said high potential is applied to said test wiper, means responsive to operation of said second relay for operating said wiper set to select the next trunk in said group so that the trunks in said group may be successively selected by said wiper set, means responsive jointly to operation of said first relay and to failure of operation of said second relay for returning a busy signal over said calling line indicating a busy condition of all of the trunks in said group, said high potential being applied to said test wiper in response to operation of said wiper set to select a busy one of the trunks in said group, and means for applying said low potential to said test wiper in response to operation of said wiper set beyond the last trunk in said group.

3. In a telephone system including a calling line, an automatic switch of the primary-secondary motions type associated with said calling line, and a group of trunks accessible to said switch; said switch comprising a wiper set including a test wiper, first and second relays, means controllable over said calling line for imparting first primary motion and then secondary motion to said wiper set to select the first trunk in said group, means controlled following said secondary motion of said wiper set to select any one of the trunks in said group for completing a first test circuit for said first relay including said test wiper, said first relay being operated via said first test circuit in the event either a first potential or a second potential is applied to said test wiper, means responsive to failure of operation of said first relay for seizing the one of the trunks in said group selected by said wiper set, means responsive to operation of said first relay for completing a second test circuit for said second relay including said test wiper, said second relay being operated via said second test circuit only in the event said first potential is applied to said test wiper, means responsive to operation of said second relay for imparting additional secondary motion to said wiper set to select the next trunk in said group so that the trunks in said group may be successively selected by said wiper set, means responsive jointly to operation of said first relay and to failure of operation of said second relay for returning a busy signal over said calling line indicating a busy condition of all of the trunks in said group, said first potential being applied to said test wiper in response to operation of said wiper set to select a busy one of the trunks in said group, and means for applying said second potential to said test wiper in response to operation of said wiper set beyond the last trunk in said group.

4. In a telephone system including a calling line, an automatic switch of the Strowger type associated with said calling line, and a group of trunks accessible to said switch; said switch comprising a wiper set including a test wiper, first and second relays, means controllable over said calling line for stepping first in the vertical direction and for stepping then in the rotary direction said wiper set to select the first trunk in said group, means controlled following said stepping in the rotary direction of said wiper set to select any one of the trunks in said group for completing a first test circuit for said first relay including said test wiper, said first relay being operated via said first test circuit in the event either a first potential or a second potential is applied to said test wiper, means responsive to failure of operation of said first relay for seizing the one of the trunks in said group selected by said wiper set, means responsive to operation of said first relay for completing a second test circuit for said second relay including said test wiper, said second relay being operated via said second test circuit only in the event said first potential is applied to said test wiper, means responsive to operation of said second relay for stepping in the rotary direction said wiper set to select the next trunk in said group so that the trunks in said group may be successively selected by said wiper set, means responsive jointly to operation of said first relay and to failure of operation of said second relay for returning a busy signal over said calling line indicating a busy condition of all of the trunks in said group, said first potential being applied to said test wiper in response to operation of said wiper set to select a busy one of said trunks, and means for applying said second potential to said test wiper in response to operation of said wiper set beyond the last trunk in said group.

5. In a telephone system including a calling line, an automatic switch associated with said calling line, a group of trunks accessible to said switch, and a plurality of other lines accessible to said switch; said switch comprising a wiper set including a test wiper, first and second relays, means controllable over said calling line for operating said wiper set to select either the first trunk in said group or any one of said other lines, means controlled following operation of said wiper set to select any one of the trunks in said group or any one of said other lines for completing a first test circuit for said first relay including said test wiper, said first relay being operated via said first test circuit in the event either a first potential or a second potential is applied to said test wiper, means responsive to failure of operation of said first relay for seizing the one of the trunks in said group or said other line selected by said wiper set, means responsive to operation of said wiper set to select the first trunk in said group for conditioning said second relay, means responsive jointly to operation of said first relay and to conditioning of said second relay for completing a second test circuit for said second relay including said test wiper, said second relay being operated via said second test circuit in the event said first potential is applied to said test wiper, means responsive to operation of said second relay for operating said wiper set to select the next trunk in said group so that the trunks in said group may be successively selected by said wiper set, means responsive jointly to operation of said first relay and to failure of operation of said second relay for returning a busy signal over said calling line indicating a busy condition of all of the trunks in said group or of said other line, said first potential being applied to said test wiper in response to operation of said wiper set to select a busy one of the trunks in said group or a busy one of said other lines, and means for applying said second potential to said test wiper in response to operation of said wiper set beyond the last trunk in said group.

6. In a telephone system including a calling line, an automatic switch associated with said calling line, a group of trunks accessible to said switch, and a plurality of other lines accessible to said switch; said switch comprising a wiper set including a test wiper, first and second and third relays, means controllable over said calling line for operating said wiper set to select either the first trunk in said group or any one of said other lines, means controlled following operation of said wiper set to select any one of the trunks in said group or any one of said other lines for completing a first test circuit for said first relay including said test wiper, said first relay being operated via said first test circuit in the event either a first potential or a second potential is applied to said test wiper, means responsive to failure of operation of said first relay for seizing the one of the trunks in said groups or said other line selected by said wiper set, means controlled following operation of said wiper set to select the first trunk in said group for operating said third relay, means responsive jointly to operation of said first relay and to operation of said third relay for completing a second test circuit for said second relay including said test wiper, said second relay being operated via said second test circuit in the event said first potential is applied to said test wiper, means responsive to operation of said second relay for operating said wiper set to select the next trunk in said group so that the trunks in said group may be successively selected by said wiper set, means responsive jointly to operation of said first relay and to failure of operation of said second relay for returning a busy signal over said calling line indicating a busy condition of all of the trunks in said group or of said other line, said first potential being applied to said test wiper in response to operation of said wiper set to select a busy one of said trunks or a busy one of said other lines, and means for applying said second potential to said test wiper in response to operation of said wiper set beyond the last trunk in said group.

7. In a telephone system including a calling line, an automatic switch associated with said calling line, a group of trunks accessible to said switch, and a party line accessible to said switch; said switch comprising first and second relays, means selectively controllable over said calling line for operating said switch to select the first trunk in said group or said party line, means responsive to operation of said switch to select the first trunk in said group for operating said first relay, means for testing a trunk or said party line selected by said switch, means responsive jointly to operation of said first relay and to said testing means for operating said second relay, means responsive jointly to operation of said first relay and to operation of said second relay for reoperating said switch to select the next trunk in said group, means controllable over said calling line to register a ringing circuit for said party line, means controlled by said register means for selectively controlling said second relay, and means including said second relay for selectively setting the ringing circuit for said party line.

8. In a telephone system including a group of party lines, and an automatic switch having access to said group of party lines; said switch comprising two wiper sets having respective access to two subgroups of said group of party lines, means responsive to first and to second digits transmitted thereto for operating said two wiper sets to select two corresponding party lines in said two subgroups of party lines, a tester operative to test over a selected one of said wiper sets any one of said party lines selected thereby, a plurality of ringing codes, a divided ringing circuit having a plurality of ringing settings, a relay controllable to select either one of said wiper sets, means including a register switch responsive to a third digit transmitted thereto for effecting a corresponding control of said relay and for selecting a corresponding one of said ringing codes and for selecting a corresponding one of said ringing circuit settings and for initiating operation of said tester, and means controlled by said tester in the event the one of said party lines selected by said selected one wiper set is tested as idle for projecting ringing current thereover utilizing said selected one ringing code and said selected one ringing circuit setting.

9. In a telephone system including a calling line, an automatic switch of the primary-secondary motions type associated with said calling line, and a called line accessible to said switch; said switch comprising a relay, means responsive to seizure of said switch over said calling line for operating said relay, means responsive to operation of said relay for conditioning said switch for primary motion, means then controllable over said calling line for imparting primary motion to said switch, means responsive to said primary motion imparted to said switch for restoring said relay, means responsive to restoration of said relay for conditioning said switch for secondary motion, means then controllable for imparting secondary motion to said switch to select said called line, means for testing the idle or busy condition of said called line, means controlled by said testing means in response to the testing as idle of said called line for reoperating said relay, a source of ringing current, and means responsive to reoperation of said relay for connecting said source to said called line.

10. In a telephone system including a calling line, an automatic switch of the primary-secondary motions type associated with said calling line, and a called party line accessible to said switch; said switch comprising a relay, means responsive to seizure of said switch over said calling line for operating said relay, means responsive to operation of said relay for conditioning said switch for primary motion, means then controllable over said calling line for imparting primary motion to said switch, means responsive to said primary motion imparted to said switch for restoring said relay, means responsive to restoration of said relay for conditioning said switch for secondary motion, means then controllable over said calling line for imparting secondary motion to said switch to select said called party line, a plurality of ringing codes, means then controllable over said calling line for selecting any one of said ringing codes, means for testing the idle or busy condition of said called party line, means controlled by said testing means in response to the testing as idle of said called party line for reoperating said relay, and means responsive to reoperation of said relay for projecting said selected one ringing code over said called party line.

PIER BAKKER.

REFERENCES CITED

The following references are of record in the file of this patent:

UNITED STATES PATENTS

| Number | Name | Date |
|---|---|---|
| 1,877,883 | Kahn | Sept. 20, 1932 |
| 2,099,429 | Ostline | Nov. 16, 1937 |
| 2,239,902 | Peterson | Apr. 29, 1941 |
| 2,340,555 | Peterson | Feb. 1, 1944 |
| 2,419,282 | Ostline | Apr. 22, 1947 |